United States Patent
Kaufmann et al.

(10) Patent No.: US 9,747,313 B2
(45) Date of Patent: Aug. 29, 2017

(54) TIMELINE INDEX FOR MANAGING TEMPORAL DATA

(71) Applicants: Martin Kaufmann, Zürich (CH); Norman May, Karlsruhe (DE); Amin Amiri Manjili, Redmond, WA (US); Donald Kossmann, Zürich (CH)

(72) Inventors: Martin Kaufmann, Zürich (CH); Norman May, Karlsruhe (DE); Amin Amiri Manjili, Redmond, WA (US); Donald Kossmann, Zürich (CH)

(73) Assignee: SAP SE, Walldorf (DE)

( * ) Notice: Subject to any disclaimer, the term of this patent is extended or adjusted under 35 U.S.C. 154(b) by 97 days.

(21) Appl. No.: 13/720,469

(22) Filed: Dec. 19, 2012

(65) Prior Publication Data
US 2014/0172804 A1 Jun. 19, 2014

(51) Int. Cl.
*G06F 7/00* (2006.01)
*G06F 17/00* (2006.01)
*G06F 17/30* (2006.01)

(52) U.S. Cl.
CPC .. *G06F 17/30321* (2013.01); *G06F 17/30067* (2013.01); *G06F 17/30309* (2013.01)

(58) Field of Classification Search
CPC ........... G06F 2201/84; G06F 17/30067; G06F 11/1451; G06F 11/1435; G06F 11/1469; G06F 17/30321; G06F 17/30309
USPC ........................................................ 707/649
See application file for complete search history.

(56) References Cited

U.S. PATENT DOCUMENTS

| | | | | |
|---|---|---|---|---|
| 5,440,730 A * | 8/1995 | Elmasri | .................. | G06F 17/30 |
| 6,185,556 B1 * | 2/2001 | Snodgrass et al. | ........... | 707/687 |
| 7,617,226 B1 * | 11/2009 | Burrows | ........... | G06F 17/30067 |
| 8,046,377 B2 * | 10/2011 | Steinau et al. | ................ | 707/770 |
| 2004/0139061 A1 * | 7/2004 | Colossi et al. | .................... | 707/3 |
| 2004/0220940 A1 * | 11/2004 | Berks | ................ | G06F 17/30286 |
| 2005/0033720 A1 * | 2/2005 | Verma | .................... | G06F 9/466 |
| 2005/0071341 A1 * | 3/2005 | Chkodrov et al. | ........... | 707/100 |
| 2005/0192995 A1 * | 9/2005 | Li | ...................... | G06F 17/30345 |
| 2006/0085456 A1 * | 4/2006 | Pickering | ...................... | 707/100 |
| 2006/0212492 A1 * | 9/2006 | Jacobs | ............. | G06F 17/30551 |
| 2007/0130171 A1 * | 6/2007 | Hanckel | ............ | G06F 17/30551 |
| 2007/0233683 A1 * | 10/2007 | Verma | .................... | G06F 9/466 |
| 2008/0215546 A1 * | 9/2008 | Baum et al. | ...................... | 707/3 |
| 2009/0019038 A1 * | 1/2009 | Millett | .............................. | 707/5 |

(Continued)

FOREIGN PATENT DOCUMENTS

EP 2608073 A1 6/2013
WO WO 2008/061254 A1 5/2008

*Primary Examiner* — Kris Mackes
*Assistant Examiner* — Lin Lin Htay
(74) *Attorney, Agent, or Firm* — Sterne, Kessler, Goldstein & Fox P.L.L.C.

(57) ABSTRACT

Embodiments described herein generally relate to creating a timeline index for executing queries on temporal data. A computer-implemented method is described. The method includes creating a first list of tuples that are invalidated in a temporal table and sorting the first list of the invalidated tuples. The method can further include creating a second list of tuples that are activated in the temporal table and combining the first list and the second list into a third list that includes the activated tuples and the invalidated tuples, wherein the third list contains ROW_IDs of both the activated tuples and the invalidated tuples.

16 Claims, 12 Drawing Sheets

(56) References Cited

U.S. PATENT DOCUMENTS

| | | | |
|---|---|---|---|
| 2009/0248727 A1* | 10/2009 | Hughes | G06F 17/30551 |
| 2011/0161379 A1* | 6/2011 | Grund | G06F 17/30312 707/812 |
| 2011/0302205 A1* | 12/2011 | Sinha | G06F 17/30309 707/769 |
| 2012/0096052 A1* | 4/2012 | Tolia | G06F 11/1435 707/806 |
| 2012/0166419 A1* | 6/2012 | Enoki et al. | 707/714 |

* cited by examiner

| PK | Value |
|----|-------|
| c  | 1.0   |
| e  | 7.0   |

FIG. 1

| ROW_ID | PK | Value | Validfrom | Validto |
|---|---|---|---|---|
| 1 | a | 2.0 | 101 | 103 |
| 2 | b | 3.0 | 102 | 107 |
| 3 | c | 1.0 | 103 | - |
| 4 | a | 5.0 | 103 | 106 |
| 5 | e | 7.0 | 105 | - |
| 6 | f | 4.0 | 105 | 106 |

FIG. 2

TIMELINE INDEX FOR MANAGING TEMPORAL DATA

BACKGROUND

Field

Embodiments described herein generally relate to managing temporal data, and more particularly to supporting a time dimension for managing temporal data.

Background

Managing and analyzing data in its current form and with its history is called temporal data management. Temporal data management is of increasing importance for business analytics to enable use of past data to predict future trends. However, support for temporal queries in commercial databases remain constrained and has not yet reached the same level of maturity available for conventional queries.

This may be due to a number of challenges. First, adding a temporal dimension increases the amount of data that needs to be managed as older versions of data are not overwritten, but appended. Second, there is often a decrease in performance of queries when the history of data is growing. Third, the representation of time as intervals of varying size can lead to complex and hard-to-evaluate expressions.

At a physical storage layout level, there is no obvious order in which data can be arranged as at least two dimensions of sorting are needed for starting and ending times. Since temporal predicates are often not very selective, using standard multi-dimensional indexes (for example, R-trees) may not be a viable option. Similarly, ad-hoc resorting or replicating data with different orderings is also not helpful due to limitations in supporting both dimensions efficiently in a same query and the associated overhead.

Data which is ordered physically by transaction start time provides less expensive update cost and can also support queries in the time dimension. But, it may not support common optimizations in column stores based on resorting and compression. Further, the existing data structures for temporal data provide only partial solutions. The existing data structures may have been developed to support a single type of temporal query such as time travel, temporal aggregation or temporal join, and may require a different data structure based on the aggregation function. Furthermore, most of these data structures have been designed with disk-based row-stores in mind, optimizing for block I/O and constraining themselves to variants of transaction start time order.

BRIEF SUMMARY

Briefly stated, embodiments include system, method and computer program product embodiments, and combinations and sub-combinations thereof, directed to timeline index based management of temporal data in a database management system.

Embodiments described herein generally relate to creating a timeline index for executing queries on temporal data. A computer-implemented method is described. The method includes creating a first list of tuples that are invalidated in a temporal table and sorting the first list of the invalidated tuples. The method can further include creating a second list of tuples that are activated in the temporal table and combining the first list and the second list into a third list that includes the activated tuples and the invalidated tuples, wherein the third list contains ROW_IDs of both the activated tuples and the invalidated tuples.

Further features and advantages and the structure and operation of various embodiments of the invention are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

The accompanying drawings, which are incorporated herein and form part of the specification, illustrate various exemplary embodiments and, together with the description, further serve to explain various underlying principles and enable a person skilled in the relevant art to make and use the invention.

FIG. 1 is a diagram illustrating a table in a database system.

FIG. 2 is a diagram illustrating a temporal table.

Figure 3:
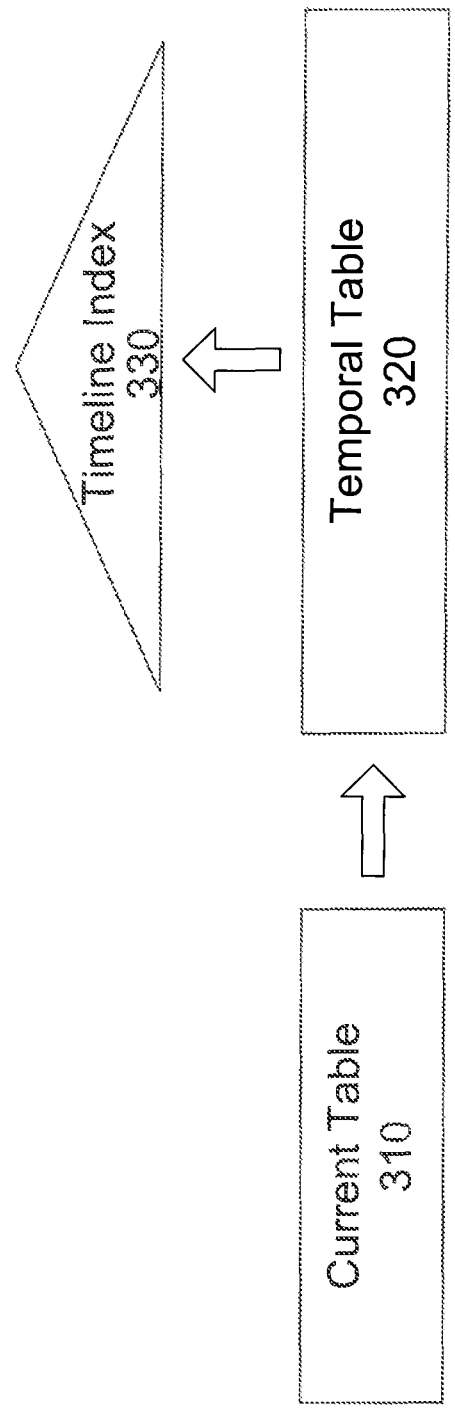
FIG. 3 is a diagram illustrating an architecture of a temporal storage system, in accordance with an embodiment.

The following description makes reference to the accompanying drawings. Generally, like reference numbers indicate identical and/or functionally similar elements. Additionally, in general, the left-most digit of a reference number will identify the drawing in which the reference number first appears.

DETAILED DESCRIPTION

The following detailed description refers to the accompanying drawings to illustrate various exemplary embodiments. Other embodiments are possible, and modifications can be made to the embodiments within the spirit and scope of this disclosure. It will be apparent to one of skill in the art that such embodiments can be implemented in different embodiments of software, hardware, firmware, and/or processing unit. Any code or syntax used to describe embodiments does not limit such embodiments to specialized hardware, firmware, software, or processing unit capable of executing such code or syntax. Furthermore, the operational behavior of such embodiments well be described herein with the understanding that various modifications and variations of the embodiments are possible.

Any reference to modules in this specification and the claims means any combination of hardware or software components for performing the intended function. A module need not be a rigidly defined entity, such that several modules may overlap hardware and software components in functionality. For example, a module may refer to a single line of code within a procedure, the procedure itself being a separate module. One skilled in the relevant arts will understand that the functionality of modules may be defined in accordance with a number of stylistic or performance-optimizing techniques, for example.

Embodiments provide for creation of a timeline index, a unified data structure, to support management of temporal data in a time dimension. Embodiments also provide efficient support for temporal operators (for example, temporal aggregation, time-travel and temporal joins) in a single, unified data structure. Embodiments further provide for a system with a timeline index independent of the physical order of data to enable optimizations for main-memory column stores. Embodiments can also utilize existing columnar storage for data with time intervals as the temporal processing is orthogonal to regular storage, and does not require storing temporal data in start timestamp time order. This permits reordering optimizations for better compression of the temporal data.

Overall Architecture

Figure 1:
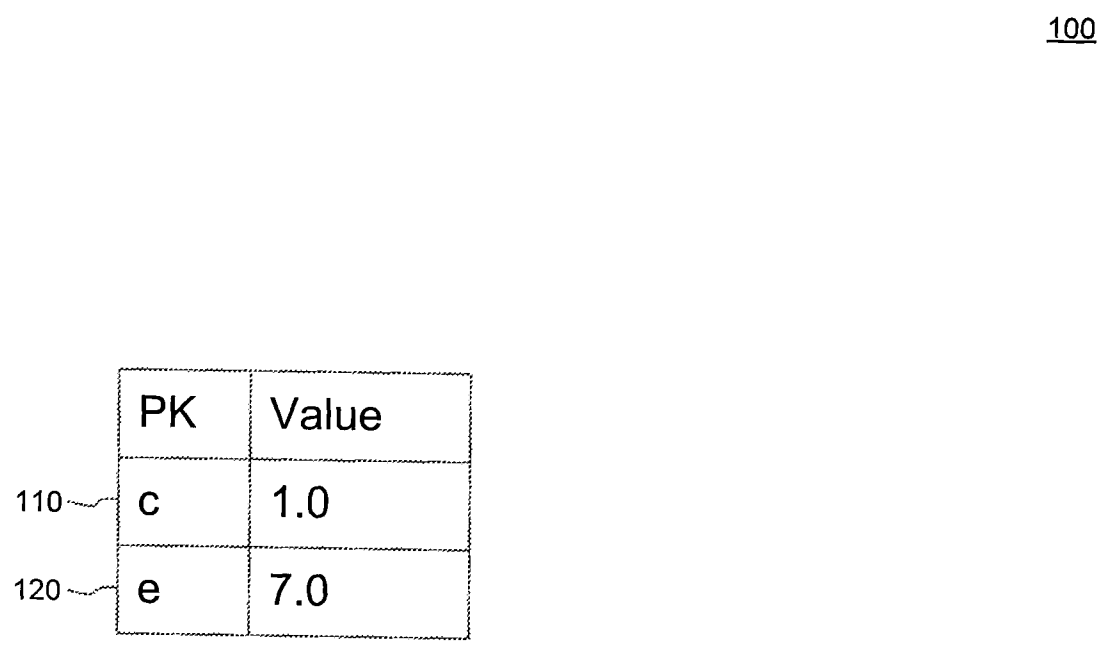

FIG. 1 is a diagram illustrating a table 100, called herein a current table, for storing data. A current table 100 stores current values of data tuples (or column entries). For example, table 100 shows two tuples, 110 and 120. Tuple 110 in the first row has a primary key 'c' and a value of 1.0. Tuple 120 in the second row has a primary key 'e' and a value of 7.0.

Current table 100 is a table (for example, in a column or a row store format) in a database. Current table 100 does not contain any time information about tuples 110 and 120. FIG. 2 is a diagram illustrating a temporal table 200 in accordance with an embodiment. A temporal database is a database with built-in time aspects. Each tuple in temporal table 200 has two time intervals, validfrom 240 and validto 250. The timestamps used in time intervals 240 and 250 are discrete, monotonically increasing and scoped at a database level. For example, time intervals 240 and 250 can be called as Version_IDs in abstract terms. A ROW_ID 260 uniquely identifies a row at a given point in time. Multiple versions of a row can be stored in a temporal table 200 and multiple rows can have the same validfrom 240 and validto 250 combination.

Time intervals can exist in two forms. Open—with a validto set to undefined or NULL—which means the value is still valid for a current version. Closed—with a validto value—meaning it has been invalidated by this version. Tuples with open intervals can be closed by adding a validto value, which is called as invalidation. Tuples with closed intervals are immutable. In a basic form, temporal table 200 can support only append operations and update of validto values for invalidation. Temporal table 200, however, can support other well-known operations.

Temporal table 200 contains tuples with validity intervals identified for each tuple as shown in the following examples:

Example 1: Tuple 220 with a primary key 'c', a value of 1.0, validfrom version 103, and validto NULL.
Example 2: Tuple 220 with a primary key 'a', a value of 5.0, validfrom version 103 and validto version 106.

There is no requirement for temporal table 200 to be stored in validfrom order, but the immutability of existing tuples is required. This allows ordering the contents by data values to enable certain functionality, for example, compression in columns. The ability to store current values of tuples in temporal table 200 simplifies temporal operations and makes queries on temporal data efficient. The following are examples of database operations on temporal table 200:

Insert:
Creates a tuple with a key and a value, opens the time interval with current commit ID as validfrom and leaves validto as NULL. For example, tuple 230 is created with a key (or a primary key) of 'c', a value of 1, validfrom value of 103 and validto value of NULL. A NULL value for validto time interval shows that the current version of a tuple is still valid.

Delete:
Sets the current Version_ID as the validto value of an existing tuple (i.e., invalidates it).

Update:
Combines delete and insert operations. Invalidates an existing tuple and creates a new tuple with the same key, the updated value and an open valid interval.

FIG. 3 is a diagram illustrating a system 300 in accordance with an embodiment. System 300 includes a current table 310, a temporal table 320 and a timeline index 330. In an embodiment, current table 310, temporal table 320 and timeline index 330 are instantiated for each history-enabled table in system 300.

Current table 310 is similar to current table 100 in FIG. 1 described above. Temporal table 320 can store multiple versions of tuples (including a current version) with validity intervals identified for each version of the tuple as described above. The table schema of temporal table 320 is similar to table schema of current table 100, but extended with standard columns containing temporal validity information.

Timeline index 330 is an index data structure on temporal table 320. Timeline index 330 can be used to speed up temporal queries. In an embodiment, timeline index 330 can include three different kinds of information—an invalidation index, an activation index, and a checkpoint, as described below in FIG. 4.

Invalidation Index

Figure 4:
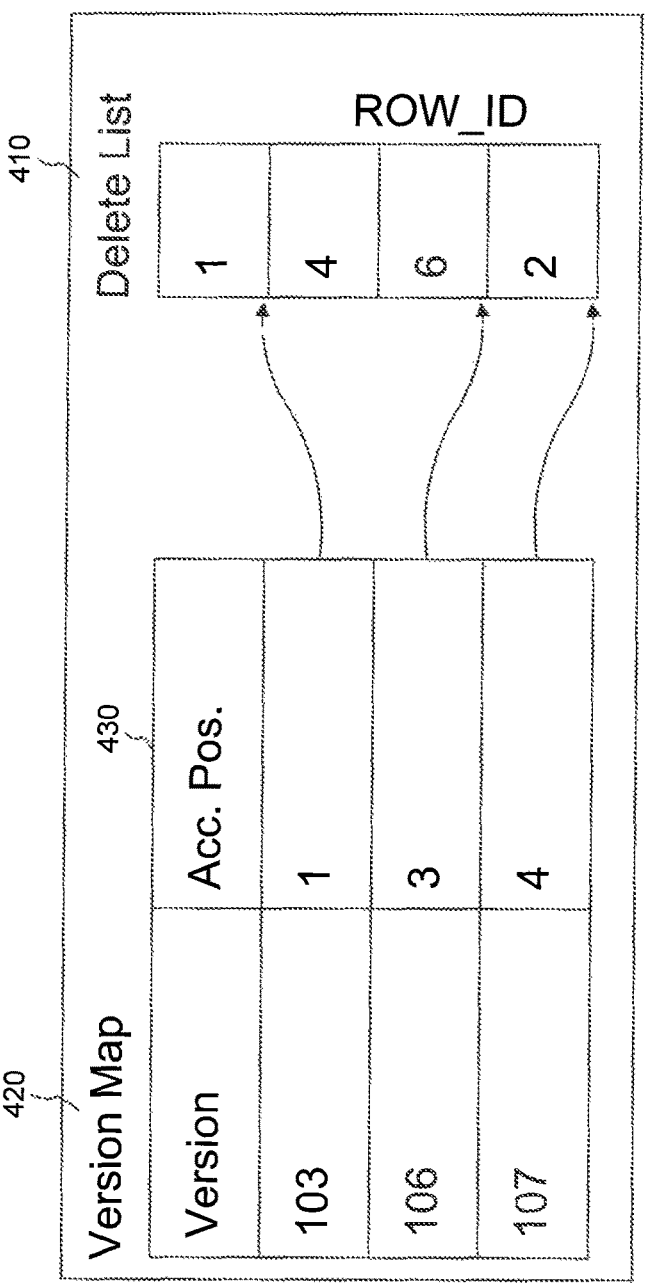
FIG. 4 is a diagram illustrating an invalidation index for a temporal table, in accordance with an embodiment.

FIG. 4 is a diagram illustrating an invalidation index 400 in accordance with an embodiment. Invalidation index 400 shown in FIG. 4 gives for each version a set of tuples which have been invalidated and implements a log style version representation.

For many temporal operations, either all tuples which were valid for a particular version or all changes in validity at a particular version need to be determined. As the size of (validfrom, validto) intervals is variable, no single total order can be established that would allow a fast and minimal index scan of a table to collect all the affected tuples.

As discussed above, it is also not possible to sort a table effectively in more than one spatial or temporal dimension as it may lead to suboptimal solutions. For example, an operation may have to scan the entire remaining table to find a matching value for the other dimension (high computational cost) or fully replicate tables with different sorting (significant storage overhead). Instead, keeping an index for particular versions can be more efficient. However, representing the fall active tuple information (for example, in a bit vector) at each version can create significant overhead. Therefore, constructing an index on tuples that become invalid for each version (Version_ID→({Invalidated})) can provide a compact representation.

In FIG. 2 above, ROW_ID 4 and ROW_ID 6 contain two invalidations at version 106, leading to an entry of 106→4,6. By keeping this table in Version_ID order (for example, validto), efficient access can be provided to the invalidations for a specific version (for example, by hashing or searching) and the invalidations of a sequence of versions (for example, by contiguously scanning). If temporal table 200 is ordered by validfrom, changes can be easily computed for each version by scanning temporal table 200 for validfrom values for each version and looking up the matching invalidations from invalidation index 400.

The physical implementation can use virtual ROW_IDs to refer to invalidated tuples in temporal table 200. In a column store, virtual ROW_IDs can be expressed as positions in column arrays, thus not requiring any additional storage space. This index may require access to a list of ROW_IDs which has a variable length (with amortized constant costs) to represent mapping outlined above in an efficient manner. For example, a counting sort algorithm with two tables/arrays can be used as shown in FIG. 4.

In particular, FIG. 4 shows a Delete List 410 which shows a list of ROW_IDs of invalidated tuples of temporal table 200 sorted by validto. FIG. 4 also contains a Version Map 420 which has an array of Accumulated Positions 430 in Delete List 410, grouped by Version_ID, providing the version-specific segment of Delete List 410. Accumulated positions 430 serve as references into Delete List 410. Accumulated position 430 of a previous version tells us how many entries can be skipped without additional computations (for example, the starting point). Accumulated position 430 of a current version provides the end position of the relevant entries in Delete list 410.

For example, a data structure that implements a two-dimensional array with variable lengths for each dimension and linearized in one dimension can be used. The set of invalidated positions in temporal table 200 for a given version 'v' stored in Version Map 420 is represented in Delete List 410 by an interval. The end location of this interval is stored as Accumulated Position 430 for each version in Version Map 420. The length of the interval can be computed as the difference to Accumulated Position 430 of the previous version.

Timeline Index

Figure 5:
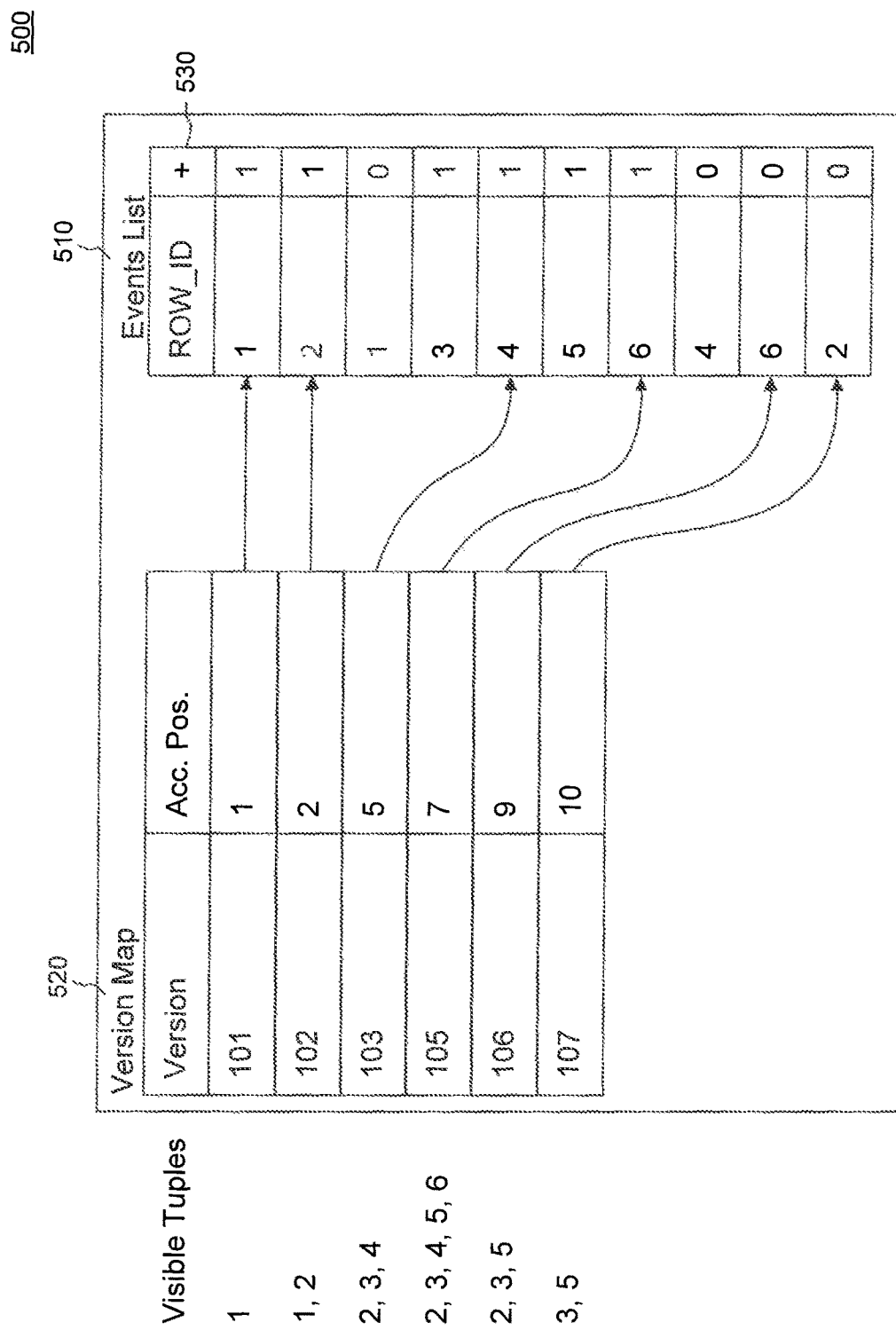
FIG. 5 is a diagram illustrating a timeline index for a temporal table, in accordance with an embodiment.

FIG. 5 is a diagram illustrating a timeline index 500 in accordance with an embodiment. The use of invalidation index 400 in FIG. 4 above may solve two-dimensional sorting problem, but may require temporal table 200 to be sorted in validfrom order, resulting in less optimum situations for compression and improved query optimizations. This can be addressed by using an index similar to invalidation index 400 for activation as well.

For a given Version_ID, an activation Index may return a set of all tuples which became valid in a temporal table 200, Version_ID→({Activated}). A tuple becomes valid when it is added to temporal table 200 by an Insert operation or if a new version is added by an Update of an existing previous value. Since the implementation of an activation Index is identical to invalidation index 400 in FIG. 4 above, these two indexes can be unified into a single data structure, a timeline index 500, for both activation and deactivation as shown in FIG. 5. For example, Version_ID→({activated_tuple}, {invalidated_tuple}).

Version Map 520 is similar to Version Map 420, but Delete List 410 is generalized to Event List 520 which contains ROW_IDs of both activated and invalidated tuples. An additional bit vector 530 identifies if a tuple has been activated or invalidated. By using timeline index 500, the space of Version Map 520 can be linear to the number of versions and the space of Event List 510 is linear to the number of changed tuples.

Checkpoints

Figure 6:
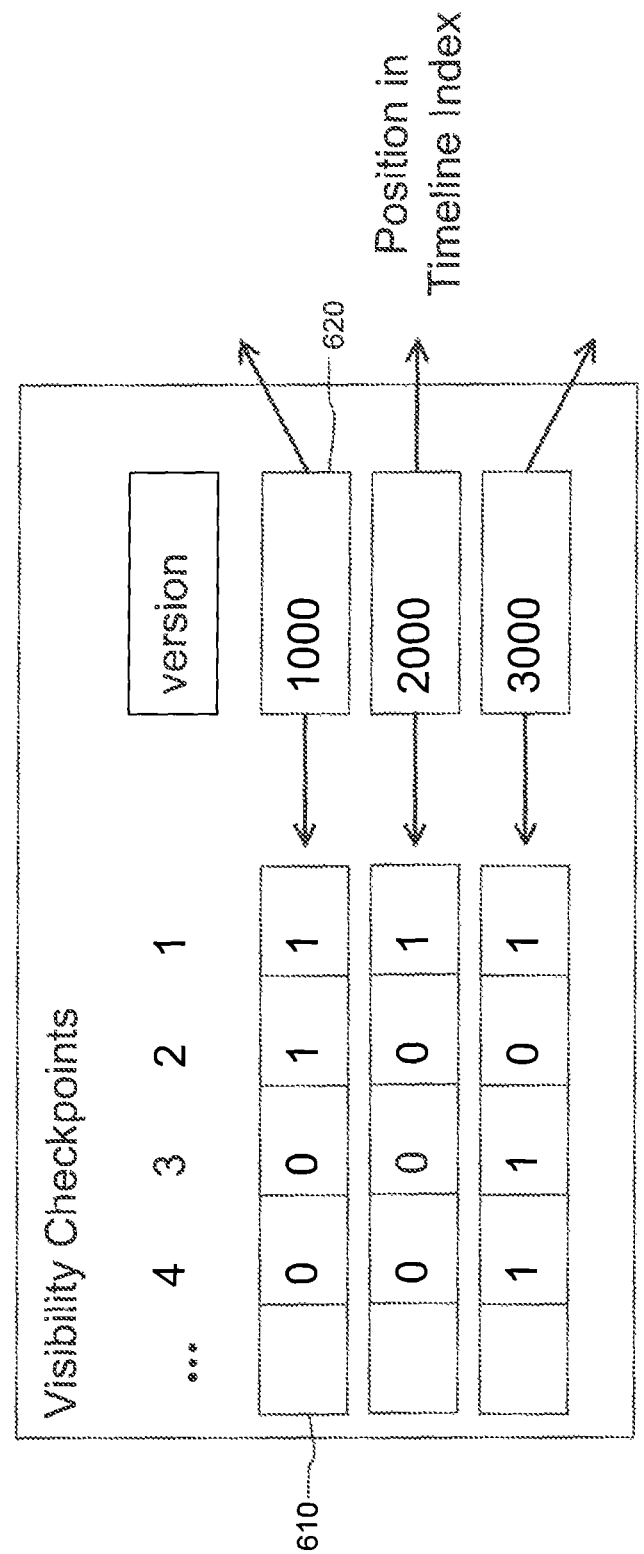
FIG. 6 is a diagram illustrating tuples that are valid/invalid for a number of versions.

FIG. 6 is a diagram illustrating tuples that are valid/invalid for a temporal table, for example, a checkpoint 600 in accordance with an embodiment. Encoding the differences between versions in timeline index 500 can lead to a compact representation of evolving versions and supporting temporal aggregations. However, reconstructing all tuples of a single version may require complete traversal of the index which can lead to linearly increasing cost to access (later) versions. Additionally, removing old versions for archiving or garbage collection may not be possible. This can be addressed by augmenting the difference-based timeline index 500 with a number of complete version representations at particular points in the history, called a checkpoint 620.

FIG. 6 identifies tuples that are valid/invalid for a number of versions (for example, a checkpoint). As shown in FIG. 6, the set of active tuples is represented by a bit vector 610 where an i-th bit indicates that tuple with ROW_ID i is active (if set) or not (if not set) for a given version. In such an implementation, the size of bit vector 610 is equal to the number of tuples stored in temporal table 200 at the time a checkpoint 620 is created. The Checkpoints are indexed by mapping Version_ID at which a checkpoint 620 has been taken to the checkpoints contents, augmented by the position of the entry in the Version Map following the checkpoint so that the scan can be started there.

For example, organizing checkpoints in this way can enable access to checkpoints with $\mathcal{O}(\log n)$ in the worst case and $\mathcal{O}(1)$ for most cases. This cost is determined by checkpoint creation policy. If checkpoints 620 are created at roughly the same intervals (for example, after a fixed number of Version_IDs in the temporal table), the position can be computed by a simple modulo operation. If the distances are more varied (for example, after a fixed number of operations for the specific table), a search can be required. With the check point approach, a good trade-off between storage space, update cost and query performance can be achieved.

Further improvements may be possible by using techniques such as delta checkpoints (storing the difference to a previous checkpoint) or bit vector compression such as run-length encoding or using Chord bit vector format. In addition, checkpoints are also useful with archiving, garbage collection, parallelization and distribution by providing clear "cuts." Further, versions before a checkpoint can now be moved to a different location (for example, a disk or remote storage), queried in isolation or can be discarded without affecting later data.

Timeline Index Computation

A scan of the intermediary table is performed to count the number of invalidations and activations per version. This value is written to the Version Map whenever the value for the current version is larger than zero. Knowing the total number of versioned tuples from the last aggregated position, space is allocated for the Event List. Now, in a second scan of temporal table, the ROW_IDs are written for each validfrom and validto at the positions given by the Version table. As described above, a bit vector is set to "true" if the tuple is activated at this version and the bit vector is set to "false" if it is invalidated.

The overall cost of this algorithm is linear in the size of the temporal table since it needs to touch each tuple at most three times—once for counting the number of events per Version_ID, once for writing the Event List. It is also clear that the order of data in the temporal table is irrelevant, since the intermediary table performs Counting Sort in linear time. Furthermore, one can derive the incremental version of this algorithm easily, since the order of version changes in the system is strictly the same as the order in the index (both use validfrom), so the new version numbers as well as activation/invalidation entries can simply be appended, producing the same result as running the index over the whole sequence.

History Operators

Timeline index can provide efficient support for a wide range of temporal queries, for example, temporal aggregation, time-travel, and temporal join.

Temporal Aggregation

Temporal aggregation shows how values develop over time. Timeline index can efficiently support temporal aggregation as it records changes between versions, and thereby deriving an aggregate for a specific version from the aggregate for a previous version. The type of aggregate function used can impact the way the computation is performed. In particular, differences between cumulative aggregates (for example, SUM and COUNT) and selective aggregates (for example, MIN and MAX) can play an important role.

SUM and COUNT

Figure 7:
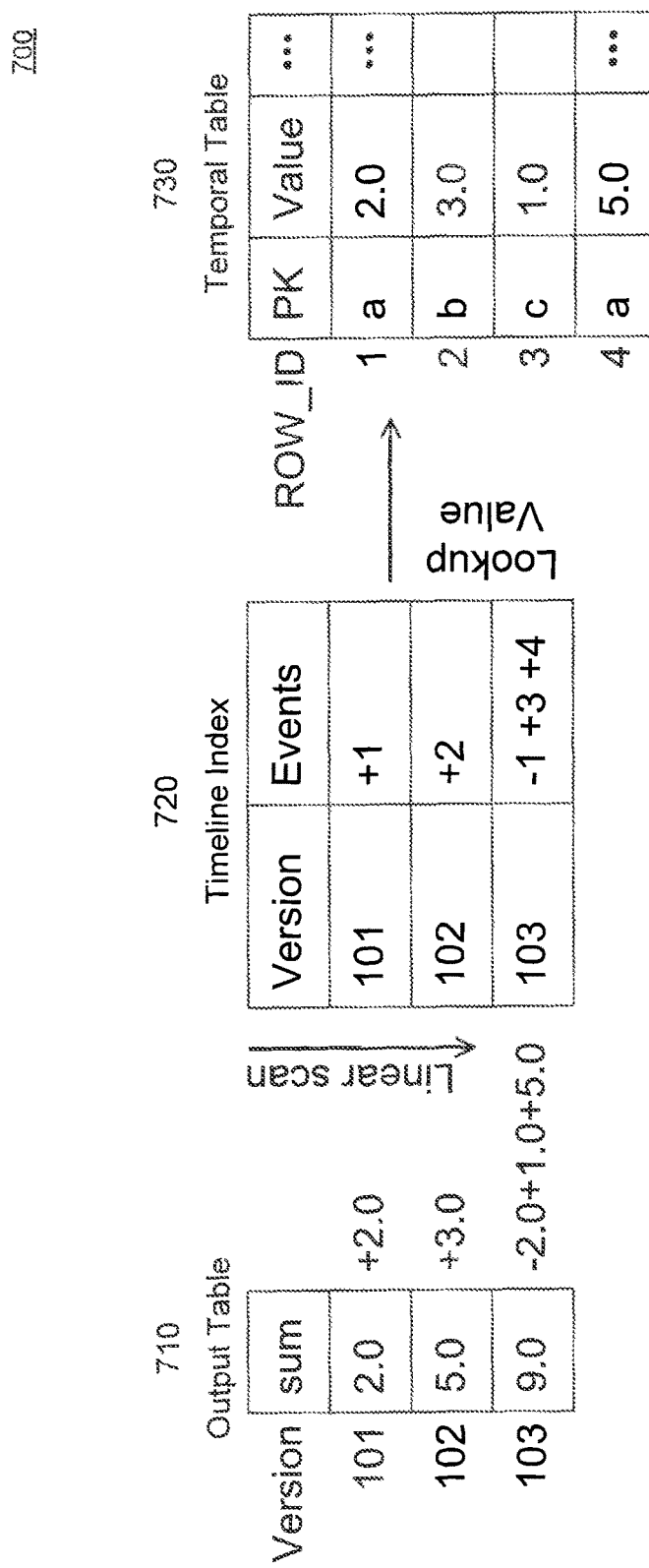
FIG. 7 is a diagram illustrating calculation of temporal aggregation, in accordance with an embodiment.

FIG. 7 is a diagram illustrating calculation of temporal aggregation 700 in accordance with an embodiment. As SUM and COUNT are cumulative aggregates, a new aggregate value can be computed directly by knowing previous aggregate value and change in value from a previous aggregate value.

Example—Total value of all unshipped items at each time in history

```
select sum(L_EXTENDEDPRICE) as total
from LINEITEM li
where li.L_LINESTATUS = 'O'
group by li.VERSION_ID( );
```

FIG. 7 shows an evaluation mechanism for SUM. Using a single variable for an aggregate value, a linear scan of timeline index 720 is performed to determine tuples changing for each version. These tuples are looked up from temporal table 730 and applied on an aggregation variable. When a version has been computed completely, it is appended to output table 710. For example, the evaluation for each aggregation function is performed as follows:

Sum: Perform lookup via ROW_ID to a temporal table 730, add/subtract values for activation/invalidation.

Example: At version 101, tuple with ROW_ID 1 is activated. Its value 2.0, becomes the sum for version 101. At Version 102, tuple with ROW_ID 2 becomes active, and its value 3.0 is added. At version 103, tuple with ROW_ID 1 is invalidated and its value of 2.0 is subtracted. In addition, two new rows become visible (ROW_ID 3 and 4 with values 1.0 and 5.0), which yields a summarized value of 9.0.

Count: Instead of performing a lookup of tuples, the number of activated and invalidated tuples from timeline index 720 is used without a lookup in temporal table 730. Since each event is processed exactly once and updates of the aggregation variable have constant cost, the complexity of SUM and COUNT is $\mathcal{O}(n)$ for a temporal table of size "n".

MIN and MAX

Figure 8:
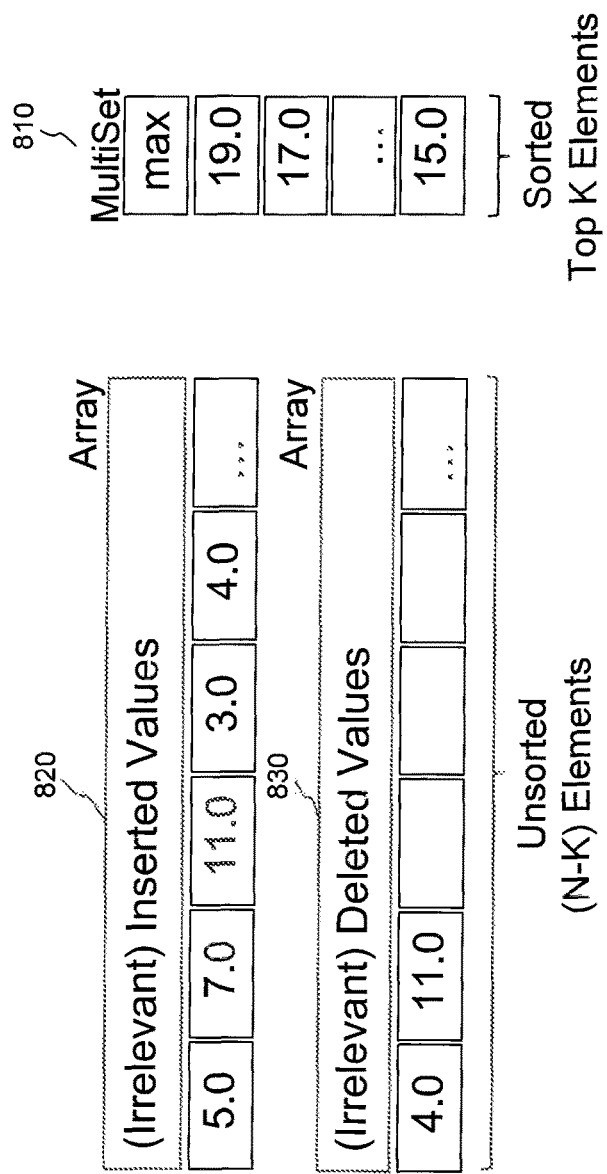
FIG. 8 is a diagram illustrating calculation of temporal aggregation, in accordance with an another embodiment.

FIG. 8 is a diagram illustrating calculation of temporal aggregation 800 to calculate MIN and MAX values in accordance with an embodiment. A typical implementation to calculate MIN or MAX values may fully sort, merge and expire both sets for every version, which can incur a significant performance overhead. This problem can be addressed by sorting only Top-K values while the rest of activations 820 and invalidations 830 can be recorded in a vector as shown in FIG. 8.

Example—price of the most expensive unshipped item at each time in history

```
select max(li.l_extendedprice) as max_price
from LINEITEM li
where li.L_LINESTATUS = 'O'
group by li.VERSION_ID( );
```

Top-K values are represented as an ordered MultiSet. A MultiSet is a set which allows duplicates. For a properly chosen K, nearly all activations and invalidations can be handled from Top-K MultiSet 810, while yielding almost constant update cost due to the small value of log k. When a Top-K structure runs empty due a large number of invalidations, the vectors of unused values can be consulted to replenish the Top-K structure. A full sorting may not be needed since we are only interested in the (Unsorted) top H candidates (H≤k) to refill. During the traversal of the versions, activations and invalidations are checked to determine which versions are actually relevant. Furthermore, the traversal and correlation mechanism is used to discard outdated parts of the vectors in bulk.

AVG, VARIANCE, STDEV

Average, Variance, and Standard Deviation functions can be computed as a combination of other aggregation functions. Other custom functions may be computed by accessing all tuples which are in a current visibility window. This window can be constructed by a linear scan of timeline index described in FIG. 5 above.

Time-Travel Query

Establishing a consistent view on a previous version of a database may be the commonly used temporal operator in commercial systems. It allows to perform regular value queries on a single, older version of database.

Example—At a given time in history, how often was the stock level of a product at a supplier less than 100.

```
select count(*)
from partsupp
where PS_AVAILQTY < 100
as of TIMESTAMP '2012-01-01'
```

This query will return a single tuple with the number of tuples in partsupp that fulfill the value criterion and come from the VERSION_ID associated with the timestamp.

Figure 9:
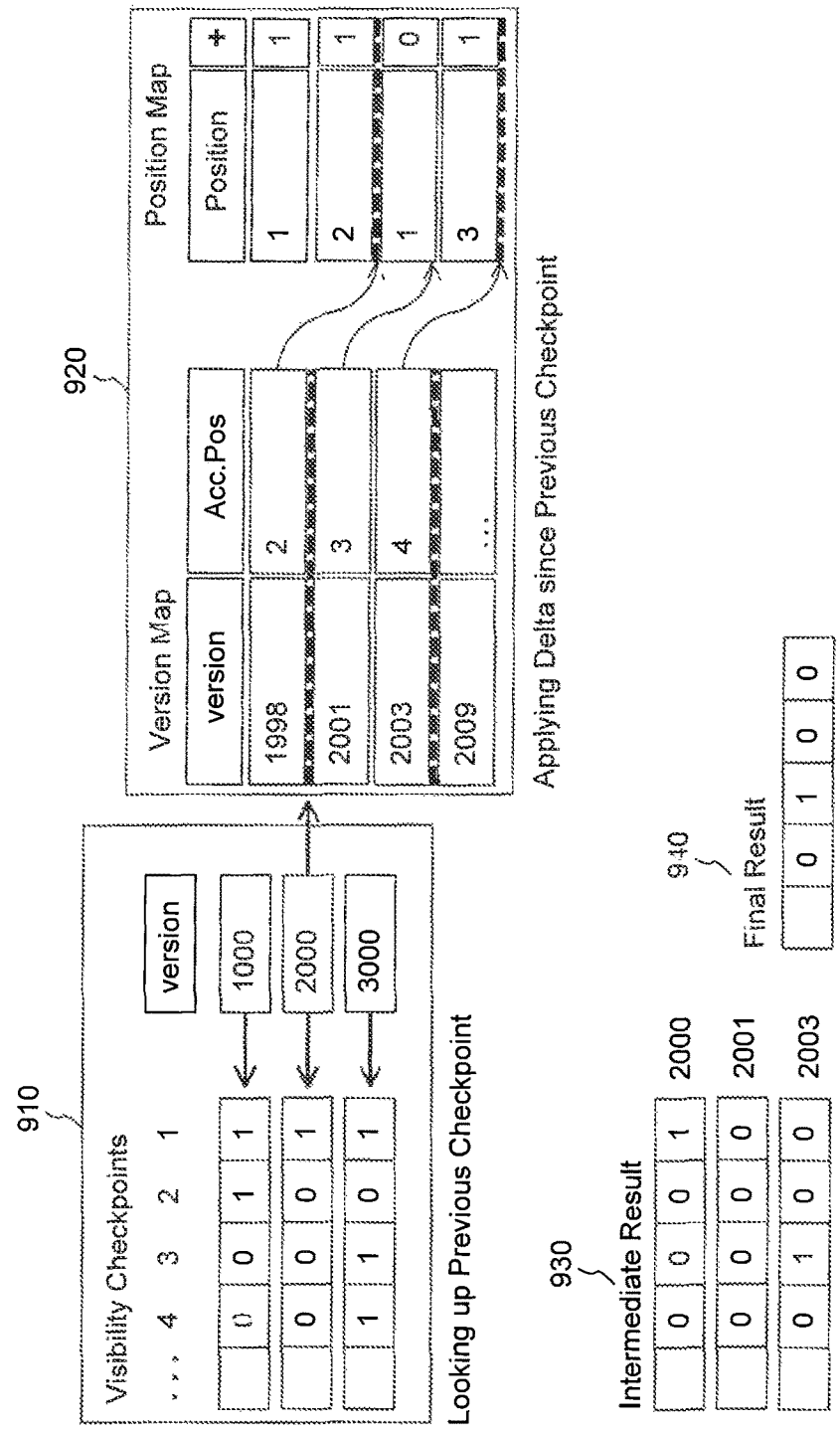
FIG. 9 is a diagram illustrating going back to an older version of a database, in accordance with an embodiment.

FIG. 9 is a diagram illustrating going back to an older version of a temporal table, in accordance with an embodiment. For time travel, a consistent version VS needs to be established to provide access to all the tuples that are valid for this version. As shown in FIG. 9, this can be achieved by going back to a nearest previous checkpoint (if it exists) or otherwise to the beginning of timeline index. For example, when providing a time travel to version 2005, checkpoint version 2000 can be accessed. The active set of this checkpoint is copied to an intermediate data structure 930, ROW_ID 1 in FIG. 9.

A linear traversal of timeline index is then performed until the version considered becomes greater than VS, covering versions 2001 and 2003 in Version Map 920. For these versions, the activated and invalidated ROW_IDs in the Event List are accessed and applied to intermediate data structure 930. Version 2001 invalidates ROW_ID 1, Version 2003 activates ROW_ID 3. Then the lookup of actual tuples using values in intermediate data structure 930 can be performed. In terms of cost and complexity, the rate at which we take checkpoints is the determining factor. Accessing a checkpoint can be done with a constant or a small logarithmic cost, whereas traversing timeline and applying the differences is inherently linear.

Temporal Join or Timeline Join

In this type of join, not only a value predicate needs to be evaluated, but the version numbers of the involved join partners need to match. In the interval-based temporal model, this means determining the interval intersection of versions.

Example—How often (count the number of cases) did a customer with acctbal <5000 have an open order with total price more than 10?

```
select count(*)
from customer temporal join orders
where o_orderstatus = 'O' and c_acctbal < 5000
    and o_totalprice > 10
    and c_custkey = o_orderkey
```

The Timeline Join mechanism focuses on the temporal aspect, providing most of its benefits serving temporally selective queries. It permits an equijoin for non-temporal values, making it an instance of a temporal equijoin. Its output is a slightly extended timeline index for the join result, where the entries in the event list are not individual ROW_IDs for one table, but pairs of ROW_IDs, one for each partner in a respective table.

This implementation can provide two benefits. First, additional temporal operations can be performed on the join results, enabling temporal n-way joins (in which the ROW_ID pairs become n-tuples). Second, lookup of tuples in the temporal tables can be performed. Timeline join is a merge-join on an already sorted timeline indexes, augmented by a hash-join style helper structures for value comparisons.

Figure 10:
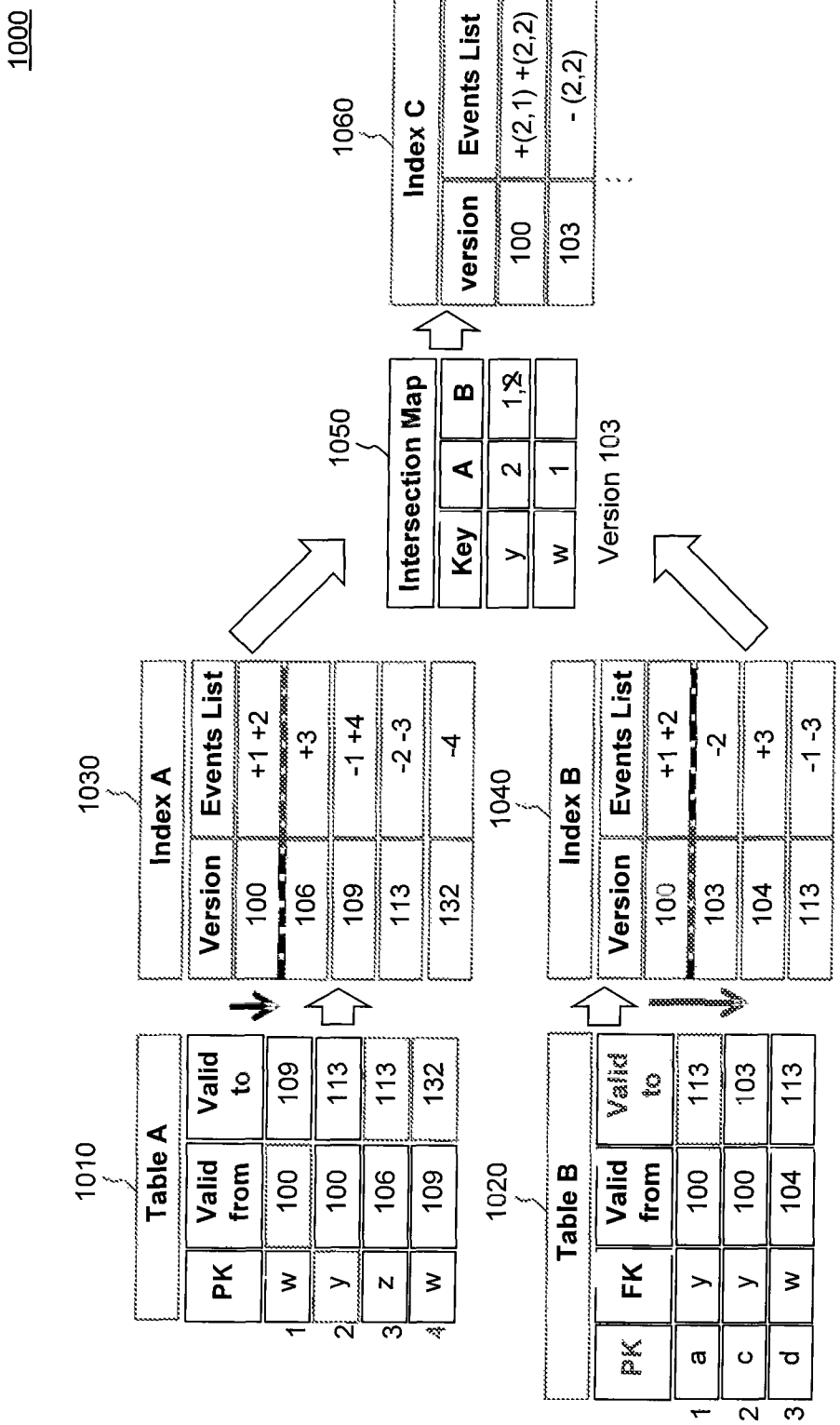
FIG. 10 is a diagram illustrating a temporal join, in accordance with an embodiment.

FIG. 10 is a diagram illustrating a temporal join 1000, in accordance with an embodiment. In a temporal join, not only a value predicate needs to be evaluated, but the version numbers of the involved join partners need to match. In an interval-based temporal model, the interval intersection of versions has to be determined. For example, how often did a customer with acctbal <5000 have an open order with total price more than 10?

```
select count(*)
from customer temporal join orders
where o_orderstatus = 'O' and c_acctbal < 5000
    and o_totalprice > 10
    and c_custkey = o_orderkey
```

Temporal Join (or Timeline Join) focuses on the temporal aspect, providing most of its benefits serving temporally selective queries. It permits an equijoin for the non-temporal values, making it an instance of a temporal equijoin. The output is a slightly extended timeline index for the join result, where the entries in the event list are not individual ROW_IDs for one table, but pairs of ROW_IDs, one for each partner in a the respective table. This design has two benefits: 1) Additional temporal operations can easily be performed on the join results, enabling temporal n-way joins (in which the ROW_ID pairs become n-tuples). 2) Lookup of tuples in the temporal tables can be performed in a lazy manner. Timeline join is conceptually a merge-join on the already sorted timeline indexes, augmented by a hash-join style helper structures for the value comparisons.

FIG. 10 shows a simplified representation of timeline index 500 with ROW_IDs listed for each version, and an activation is indicated by a "+" and an invalidation by a "−". The example in FIG. 10 shows the join of two tables, Table A 1010 and Table B 1020 with a composite predicate–a value equality A.PK=B.FK and time intervals intersection [A.validfrom, A.validto) overlap [B.validfrom, B.validto). For both tables a timeline index is required.

In addition, a hash-based Intersection Map 1030 (organized by values of join partners) is used to incrementally collect the currently intersecting tuples. Its entries contain a pair of sets of row-ids (first set for Table A and second set for Table B), formally IMap: $(v) \rightarrow (\{ROW\_ID_A\}, \{ROW\_ID_B\})$. To execute the join, a merge-join style linear scan is performed of both timeline indexes (both ordered by VERSION_ID), using head pointers to the current row of each of the indexes. Starting from smaller VERSION_ID, the head pointer of the index is advanced for the lower VERSION_ID. The following steps are performed when moving the head pointers.

For the activation of tuple a in index A, ROW_ID is added to the set for A in the intersection map, using the value of a.PK as its key: IMap(a.PK)[0] ∪(a.rowID). For the invalidation of tuple a in index A, its ROW_ID is removed from the for A in the intersection map, using the value of a.PK IMap(A.a)[0]\(A.rowID). These steps are used for B in a similar fashion, using b.FK as key and the second set. When the head pointer is advanced for index B to version 103, the invalidation of the tuple with ROW_ID 2 from table B is observed. Its FK value is y, the y entry is modified in the intersection map, removing its ROW_ID 2 from the B set. An entry for a value becomes complete, so there is now at least an entry for A and B. This results in activation entries to Index C 1040 using the pairs from the cross-product of ROW_IDs in both sets. The result of the join—a version map and another timeline index can be used by other temporal operators as described above.

An entry for a value becomes incomplete, so at least one of the sets becomes empty. The cross-product of the pairs before the removal is added as invalidation entries to C. Individual join partners are added or removed, yielding activation or deactivation pairs for this ROW_ID and its join partner. As shown in FIG. 10, removal of ROW_ID 2 for B at version 103 adds invalidation pair (2,2) because B tuple ROW_ID 2 values (c, y, 100, 103) are joined with A tuple ROW_ID 2 values (y, 100, 113) and become invalid. The cost and complexity analysis of this join algorithm shows that it needs lineal time with regard to the number of versions.

Performance

The performance of timeline index with few checkpoints is sensitive to a particular version used to answer a query. If that version is close to a checkpoint, that variant performs just as well as the variant with many checkpoints. However, if the queried version is far away from a checkpoint, then this variant requires a full table scan between two checkpoints and has high response time accordingly.

The response time of a scan-based approach to carry out time travel grows linearly with the version number at which the query needs to be carried out if the table is ordered by validfrom. In fact, the scan-based approach is preferable winner if Version 0 is used to answer the query because in this case the table is perfectly clustered. With a growing version number, more and more of the table needs to be read and in an extreme case, the whole table (with all versions of all tuples) needs to be read in order to find the current version of all tuples.

The temporal join that uses the timeline index is efficient if the selection along the temporal dimension matters. The timeline index is efficient to carry out any kind of selections in time.

Figure 11:
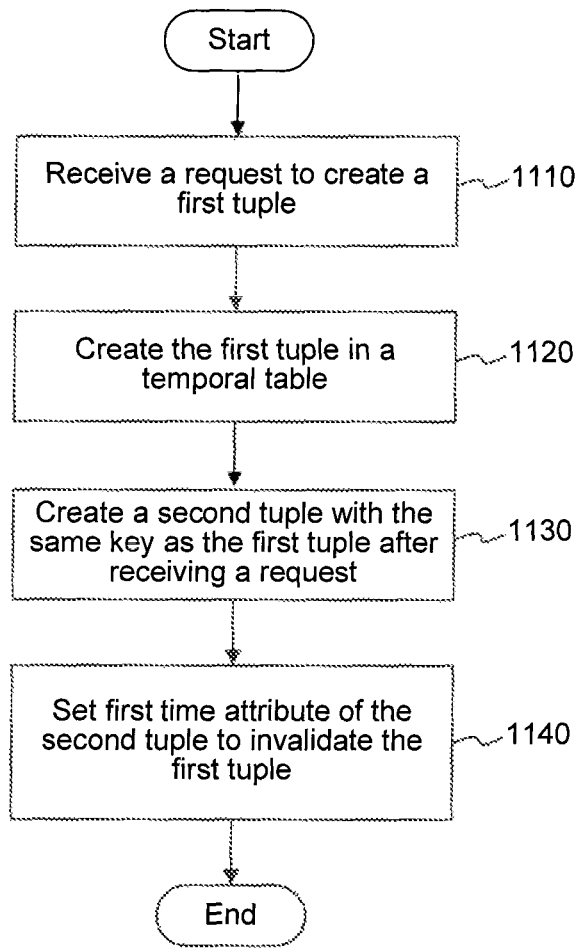
FIG. 11 is a flow diagram illustrating a method for managing tuples in a table, in accordance with an embodiment.

FIG. 11 is a flow diagram of a method 1100 for managing tuples in a table, in accordance with one embodiment. Method 1100 may be implemented by, for example and without limitation, system 200 of FIG. 2. Method 1100 begins at step 1110.

At step 1110, a request is received to create a tuple in a temporal database. For example, a request is received to create a first tuple 310 in temporal table 300.

At step 1120, a first tuple is created in a temporal table. For example, tuple 310 is created in temporal table 300 with a primary key 'a', a value of 2.0, validfrom version 101 and validto version 103. A validto version of 103 means that the value of tuple 310 has been invalidated by version 103. For example, a validto version of NULL means that the value of a tuple is still valid for that version.

At step 1130, a second tuple is created in the temporal table after receiving a request. For example, tuple 320 is created in temporal table 220 with a primary key 'a' and a value of 5.0.

At step 1140, first time attribute of the second tuple is set to invalidate the first tuple. For example, validfrom version of tuple 320 is set to version 103. Once validto version of tuple 310 is set to version 103, tuple 310 has been invalidated and is immutable. Validto version of table 320 can be set to NULL or to another version. For example, tuple 320 is set to a validto version of 106.

Computer System

Figure 12:
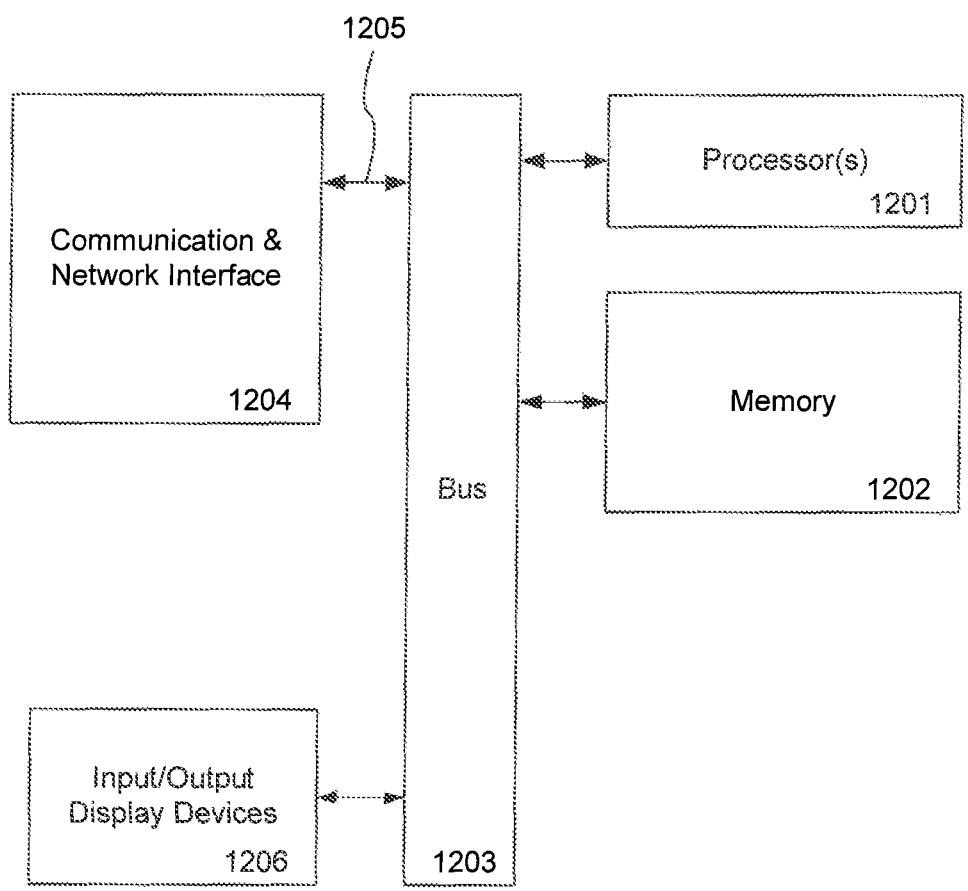
FIG. 12 is a diagram illustrating a computer system, in accordance with an embodiment.

Various aspects of the embodiments described above can be implemented by software, firmware, hardware, or any combination thereof. For example, FIG. 2 illustrates a system 200 which may include one or more computer systems, in which embodiments, or portions thereof, may be implemented as computer-readable code. Various aspects of the embodiments are described in terms of an exemplary computer system 1200 as shown in FIG. 12. For example, system 200 may be described in terms of being computer system 1200. Also, flowchart 1100 can be implemented using one or more computer systems 1200.

Computer system 1200 includes one or more processors 1201. Processor 1201 may be a special purpose processor or a general purpose processor. Processor 1201 may be connected to communication infrastructure, such as, for example, a bus 1203 and or a network. Computer system 1200 may further include memory 1202, which may include random access memory (RAM) and may also include secondary memory. Secondary memory may include, for example, a hard disk drive, a removable storage drive, and or a memory stick. A removable storage drive may comprise a floppy disk drive, magnetic tape drive, optical disk drive, flash memory, or the like. As will be appreciated by persons skilled in the relevant arts, a removable storage unit includes a computer usable storage medium having stored therein computer software and/or data. According to some embodiments, secondary memory may include similar means for allowing computer programs or other instructions to be loaded into computer system 1200 which may include, for example, a removable storage unit and associated interface. Examples include a program cartridge and cartridge interface (such as, for example, may be found in a video game device), a removable memory chip (such as, for example, an EPROM or PROM) and associated socket, and other removable storage units and interfaces which allow software and data to be transferred from a removable storage unit to computer system 1200.

Computer system 1200 includes a communication and network interface 1204. Communication and network interface 1204 may interface with remote sites, nodes, and or other networks via wired or wireless connections. Communication and network interface 1204 enables computer system 1200 to communicate over networks or mediums such as LANs, WANs, the Internet, etc. Communication and network interface 1204 may enable software and or data to be transferred between computer system 1200 and external devices, nodes, and networks. Communications and network interface 1204 may further include a modem, a communications port, a PCMCIA slot and card, or the like.

Software and data transferred via communications and network interface 1204 may take the form of signals which may be electronic, electromagnetic, optical, or other signals capable of being received by communication and network interface 1204. These signals are provided to communication and network interface 1204 via a communication path 1205. Communication path 1205 carries signals and may be implemented using wire or cable, fiber optics, a phone line, a cellular phone link, an RF link or any other communications channels.

In this document, the terms "computer program medium" and "computer usable medium" and "computer readable medium" are used to generally refer to media such as a removable storage unit, a removable storage drive, and or a hard disk installed in a hard disk drive. Signals carried over communication path 1205 may also embody the logic described herein. Computer program medium and computer usable medium may also refer to memories, such as memory 1202, which may be memory semiconductors (e.g. DRAMs, etc.). These computer program products are means for providing software to computer system 1200.

Computer programs (also called computer control logic) may be stored in memory 1202. Computer programs may be executed by processor 1201. Computer programs may also be received via communication and network interface 1204 and executed locally, remotely, and or in a distributed manner utilizing the capabilities of computer system 1200 to receive, store, process, and execute.

Such computer programs, when executed, enable computer system 1200 to implement various embodiments discussed herein. Furthermore, such computer programs, when executed, enable processor 1201 to implement the processes of embodiments. Thus, such computer programs may represent controllers of the computer system 1200. Where an embodiment is implemented using software, such software may be stored in a computer program product and loaded into computer system 1200 using a removable storage drive, interfaces, a hard drive, and or communication and network interface 1204, for example.

Computer system 1200 may also include input/output/display devices 1206, such as keyboards, monitors, pointing devices, etc. Computer system 1200 may interface with various device inputs and outputs ("I/O"), such as, for example, a display monitor, a keypad, or a touchscreen display, and any combination thereof. For example, computer system 1200 may take the form of a personal computer, a mobile device, or any device having a display and processing capabilities.

Various embodiments are also directed to computer program products comprising software stored on any computer useable medium. Such software, when executed in one or more data processing device(s), causes a data processing device(s) to operate as described herein. Embodiments may employ any computer useable or readable medium, known now or in the future. Examples of computer useable mediums include, but are not limited to primary storage devices (e.g., such as any type of random access memory), secondary storage devices (e.g., such as hard drives, floppy disks, CD ROMs, ZIP disks, tapes, magnetic storage devices, optical storage devices, MEMS, nanotechnological storage device, etc.), and communication mediums (e.g., such as wired and wireless communications networks, local area networks, wide area networks, intranets, etc.).

Reading this description, it will become apparent to a person skilled in the relevant art how to implement these embodiments using other computer systems and/or computer architectures. Embodiments may further operate with software, hardware, and/or operating system implementations other than those described herein. Therefore, any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit in any way. Various embodiments are described herein with the aid of functional building blocks for illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific disclosed embodiments will so fully reveal the general nature of the disclosed embodiments that others can, by applying knowledge within the skill of the art, readily modify and/or adapt for various applications such specific embodiments, without undue experimentation. Therefore, such adaptations and modifications are intended to be within the meaning and range of equivalents of the disclosed embodiments, based on the teaching and guidance presented herein. It is to be understood that phraseology or terminology is for the purpose of description and not of limitation, such that the terminology or phraseology of the specification is to be interpreted by the skilled artisan in light of the teachings and guidance.

The breadth and scope of the disclosed embodiment should not be limited by any of the above-described exemplary embodiments, but should be defined only in accordance with the following claims and their equivalents.

What is claimed is:

1. A computer-implemented method, comprising:
creating an activation list that contains tuples that have been activated in a temporal table within a temporal database, wherein the temporal table stores multiple versions of data contained within a tuple, and wherein each tuple in the temporal table uniquely identifies data contained within the tuple at a given point in time;
creating an invalidation list that contains tuples that have been invalidated in the temporal table;
combining the activation list and the invalidation list into an events list that includes the activated tuples and the invalidated tuples, wherein the events list includes unique row identifiers of each of the activated tuples and the invalidated tuples;
sorting the events list;
creating a version map that maps a version of the temporal table, represented by a version identifier, to a position of a tuple in the events list, wherein each temporal table version signifies a particular time interval; and
creating an array of accumulated positions that represent positions in the events list corresponding to, for each temporal table version, an end position of an interval of activated and invalidated tuples for the version, wherein the position mapped to each version identifier in the version map is an accumulated position from the array of accumulated positions,
wherein the events list, the version map, and the array of accumulated positions are part of a timeline index for the temporal table.

2. The method of claim 1, further comprising:
sorting the events list based on a non-NULL time attribute of each of the activated and invalidated tuples.

3. The method of claim 1, wherein a bit vector is configured to identify whether a tuple was activated or invalidated in the events list.

4. The method of claim 1, further comprising:
creating one or more checkpoints in the temporal table, wherein a checkpoint comprises:
a set of active tuples represented by a bit vector wherein an i-th bit indicates whether a tuple with a ROW_ID i is active.

5. The method of claim 1, wherein the temporal database supports temporal aggregations from a list comprising one or more of SUM, COUNT, MINIMUM, MAXIMUM, AVERAGE, VARIANCE, STANDARD DEVIATION, and custom aggregation functions.

6. The method of claim 1, wherein the temporal database supports a time-travel query and a temporal join query.

7. The method of claim 1, wherein a tuple is invalidated by setting a time attribute of the tuple to a non-NULL value.

8. The method of claim 1, wherein creating the array of accumulated positions further comprises:
grouping the positions in the events list by each version identifier of the temporal table to generate the array of accumulated positions.

9. The method of claim 1, wherein each tuple in the temporal table is immutable.

10. The method of claim 1, further comprising sorting the tuples of the temporal table in order of a time of activation of each tuple.

11. A system, comprising:
one or more processors; and
a memory, the memory storing instructions that, when executed by the one or more processors, cause the one or more processors to:
create an activation list that contains tuples that have been activated in a temporal table, wherein the temporal table stores multiple versions of data contained within a tuple, and wherein each tuple in the temporal table uniquely identifies data contained within the tuple at a given point in time;
create an invalidation list that contains tuples that have been invalidated in the temporal table;
combine the activation list and the invalidation list into an events list that includes the activated tuples and the invalidated tuples, wherein the events list includes unique row identifiers of each of the activated tuples and the invalidated tuples;

sort the events list;

create a version map that maps a version of the temporal table, represented by a version identifier, to a position of a tuple in the events list, wherein each temporal table version signifies a particular time interval; and create an array of accumulated positions that represent positions in the events list corresponding to, for each temporal table version, an end position of an interval of activated and invalidated tuples for the version, wherein the position mapped to each version identifier in the version map is an accumulated position from the array of accumulated positions, wherein the events list, the version map, and the array of accumulated positions are part of a timeline index for the temporal table.

12. The system of claim 11, wherein the memory further stores instructions that cause the one or more processors to:

configure a bit vector to identify whether a tuple was activated or invalidated in the events list; and create one or more checkpoints in the temporal table, wherein a checkpoint comprises a set of active tuples represented by a bit vector wherein an i-th bit indicates whether a tuple with a ROW_ID i is active.

13. The system of claim 11, wherein the memory further stores instructions that cause the one or more processors to:

support temporal aggregations from a list comprising one or more of SUM, COUNT, MINIMUM, MAXIMUM, AVERAGE, VARIANCE, STANDARD DEVIATION, and custom aggregation functions.

14. A non-transitory computer-readable medium having instructions stored thereon, execution of which, by a computing device, causes the computing device to perform operations comprising:

creating an activation list that contains tuples that have been activated in a temporal table within a temporal database, wherein the temporal table stores multiple versions of data contained within a tuple, and wherein each tuple in the temporal table uniquely identifies data contained within the tuple at a given point in time;

creating an invalidation list that contains tuples that have been invalidated in the temporal table;

combining the activation list and the invalidation list into an events list that includes the activated tuples and the invalidated tuples, wherein the events list includes unique row identifiers of each of the activated tuples and the invalidated tuples;

sorting the events list;

creating a version map that maps a version of the temporal table, represented by a version identifier, to a position of a tuple in the events list, wherein each temporal table version signifies a particular time interval; and creating an array of accumulated positions that represent positions in the events list corresponding to, for each temporal table version, an end position of an interval of activated and invalidated tuples for the version, wherein the position mapped to each version identifier in the version map is an accumulated position from the array of accumulated positions, wherein the events list, the version map, and the array of accumulated positions are part of a timeline index for the temporal table.

15. The computer-readable medium of claim 14, the operations further comprising:

configuring a bit vector to identify whether a tuple was activated or invalidated in the events list; and creating one or more checkpoints in the temporal table, wherein a checkpoint comprises:

a set of active tuples represented by a bit vector wherein an i-th bit indicates whether a tuple with a ROW_ID i is active.

16. The computer-readable medium of claim 14, wherein the temporal database supports temporal aggregations from a list comprising one or more of SUM, COUNT, MINIMUM, MAXIMUM, AVERAGE, VARIANCE, STANDARD DEVIATION, and custom aggregation functions.

* * * * *